US009641623B2

(12) United States Patent
Smith

(10) Patent No.: US 9,641,623 B2
(45) Date of Patent: May 2, 2017

(54) SYSTEM AND METHOD FOR MANAGING CONTENT ON MULTIPLE COMPUTERIZED DEVICES

(71) Applicant: Todd Christopher Smith, Springville, IL (US)

(72) Inventor: Todd Christopher Smith, Springville, IL (US)

( * ) Notice: Subject to any disclaimer, the term of this patent is extended or adjusted under 35 U.S.C. 154(b) by 0 days.

(21) Appl. No.: 15/191,650

(22) Filed: Jun. 24, 2016

(65) Prior Publication Data
US 2016/0381145 A1    Dec. 29, 2016

Related U.S. Application Data

(60) Provisional application No. 62/187,994, filed on Jul. 2, 2015, provisional application No. 62/184,225, filed on Jun. 24, 2015.

(51) Int. Cl.
G06F 15/16 (2006.01)
H04L 29/08 (2006.01)
H04L 29/06 (2006.01)

(52) U.S. Cl.
CPC .......... H04L 67/125 (2013.01); H04L 63/083 (2013.01); H04L 67/42 (2013.01)

(58) Field of Classification Search
USPC .......................... 709/208, 211, 209, 218, 224
See application file for complete search history.

(56) References Cited

U.S. PATENT DOCUMENTS

| | | | |
|---|---|---|---|
| 6,042,476 A * | 3/2000 | Ohashi | A63F 13/12 463/30 |
| 6,907,226 B2 | 6/2005 | Kang et al. | |
| 7,532,585 B2 | 5/2009 | Kim et al. | |
| 2002/0062377 A1* | 5/2002 | Hillman | H04L 29/06 709/227 |
| 2004/0062400 A1* | 4/2004 | Sovio | H04L 9/0827 380/286 |
| 2009/0182833 A1* | 7/2009 | Balasubramanian | G06Q 10/107 709/208 |
| 2014/0167955 A1* | 6/2014 | Mahajan | G08B 21/0269 340/539.12 |
| 2014/0315489 A1* | 10/2014 | Lee | G06F 3/1454 455/41.2 |

(Continued)

Primary Examiner — Lan-Dai T Truong
(74) Attorney, Agent, or Firm — Kevin Keener; Keener and Associates P.C.

(57) ABSTRACT

A system and method for controlling one or more computerized devices through a slave device that is appointed to operate as the master device is disclosed. The inventive method comprises an event defined by one or more event parameters, appointing a master device designation to a computerized device for the event, initiating a communication channel with one or more slave devices, initiating a slave application layer on one or more slave devices, presenting through the slave application layer a registration option for the event, receiving, a registration selection for the event, initiating a master application layer on the computerized device, presenting, through the master application layer, one or more slave command options, receiving, on the computerized device, one or more slave commands, and transmitting the one or more slave commands to one or more registered slave devices through the communication channel.

18 Claims, 18 Drawing Sheets

(56) References Cited

U.S. PATENT DOCUMENTS

2015/0127608 A1* 5/2015 Hsieh ................ G06F 17/30575
                                                          707/623
2015/0282234 A1* 10/2015 Sartori ................ H04W 76/023
                                                          370/329

* cited by examiner

US 9,641,623 B2

SYSTEM AND METHOD FOR MANAGING CONTENT ON MULTIPLE COMPUTERIZED DEVICES

PRIORITY

This application claims priority to U.S. Provisional Patent Application No. 62/184,225 filed Jun. 24, 2015 and U.S. Provisional Patent Application No. 62/187,994 filed Jul. 2, 2015, the disclosures of which are hereby incorporated by reference.

FIELD OF THE INVENTION

This invention pertains generally to the management of computerized content and more specifically to a system and method for managing computerized content on multiple computerized devices during a public event.

BACKGROUND OF INVENTION

Many people attend public events, such as music concerts, sporting events, political rallies, demonstrations, or the like. These events may have hundreds if not thousands of attendees. Groups of these individuals sometime like to act in concert to produce a mass effect. For instance, a large group of people may stand up at varying times in concert to create a wave effect. With the pervasiveness of smart phones in today's environment, individuals have begun using these devices to act in concert in a similar fashion. For instance, a group of individuals may each download a specific noise-making application onto their individual phones. The group may then decide to publicly play the noise produced by the application simultaneously. The current method required to organize this type of group action is limited. Individuals must organize offline prior to performing the concerted action. Alternatively, individuals may use social media to coordinate their actions. However, this is limited in that the individuals at a public event must belong to the same social group in order to coordinate.

In addition, coordinating large numbers of people at any specific time during an event is cumbersome. Separate individuals may each try to take the lead in organizing the action. These individuals may not agree on the type of action to take or the time at which to take it. The result is a haphazard action and chaos, with small groups of people each doing their own thing.

What is needed is a method which allows a group of individuals to act in a concerted manner at a public event without needing to coordinate prior to the event or needing to be part of a preexisting social group. What is also needed is a means of determining the leader of planning and coordinating the group action at a specific time or specific event.

SUMMARY OF THE INVENTION

The invention is directed toward a system and method of organizing a group of electronic devices for coordinated action. The system comprises a plurality of mobile electronic devices communicatively connected together during an event with one of the mobile electronic devices being designated as the leader. In addition there is a server computer controlling the system communicatively connected to the plurality of devices.

The method starts with a bidding system to determine which user is granted the role of the leader and organizer of the coordinated activity. In the method a group of users each bid for the leadership role of the event. Users may place incremental bids or set a high bid price. The bidding may run for a predetermined amount of time or reset every time a user places a bid up until the time of the event. When the bidding is over the winning user gets the ability to control the concerted action of the group of users at the event.

The invention is directed toward a method of controlling one or more computerized devices comprising creating, by a server computer comprising one or more microprocessors and one or more nonvolatile memory units, an event defined by one or more event parameters; appointing, by the server computer, a master device designation to a computerized device for the event, wherein the computerized device comprises on or more microprocessors and one or more nonvolatile memory units; initiating a communication channel with one or more slave devices, wherein each of the one or more slave devices comprises one or more microprocessors and one or more nonvolatile memory units; initiating a slave application layer on one or more slave devices; presenting through the slave application layer a registration option for the event; receiving, by the one or more slave devices, a registration selection for the event; initiating a master application layer on the computerized device; presenting, through the master application layer, one or more slave command options; receiving, on the computerized device, one or more slave commands; transmitting the one or more slave commands to one or more registered slave devices through the communication channel.

The method may further comprise executing the one or more slave commands through the slave application layer on the one or more slave devices. In another embodiment the slave command is selected from a group comprising: displaying a predetermined image on a display screen of the one or more slave devices, playing a predetermined sound through a speaker of the one or more slave devices, illuminating a light on the one or more slave devices, playing a predetermined portion of a song on the one or more slave devices, In another embodiment, the method further comprises receiving, by the server computer, a map of a location of the event and receiving, by the server computer, a physical location of one or more slave devices in reference to the map. The method may further comprise delaying a slave command by a predetermined amount of time based on the physical location of the one or more slave devices in reference to the map. The method may further comprise receiving a predetermined image by the server computer; dissecting, by the server computer, the predetermined image into two or more portions; and transmitting, by the server computer, a single portion of the two or more portions to one or more slave devices.

In another embodiment of the invention the method further comprises creating a registry list of one or more slave devices. In another embodiment of the invention the method further comprises presenting, by the server computer, a means for selecting a computerized device to receive a master designation. In another embodiment of the invention the method further comprises receiving, by the server computer, a request to create an event; and creating, by the server computer, an event.

In another embodiment of the invention the method further comprises removing, by the server computer, a master device designation from the computerized device; and appointing, by the server computer, a master device designation to a second computerized device for the event, wherein the second computerized device comprises on or more microprocessors and one or more nonvolatile memory units.

In another embodiment of the invention the method further comprises receiving a password protected user identification from the one or more slave devices; verifying the password protected user identification for the one or more slave devices; receiving a password protected user identification from the computerized device; and verifying the password protected user identification for the computerized device.

While at the event, the users each utilize their own mobile device. The leader chooses the group activities to be performed by the group of mobile devices during the event. The leader may be present at the event also or may be remote from the event, such as at home watching the event on television. Users may have a membership plan to purchase a set amount of bids. Alternatively, the user may have a set number of bids provided under a free account. The leader can choose a noise, sound, music, light, picture, or physical activity to be performed by the mobile devices acting in unison at the event, or their respective owners.

BRIEF DESCRIPTION OF THE DRAWINGS

Various exemplary embodiments of this invention will be described in detail, wherein like reference numerals refer to identical or similar components, with reference to the following figures, wherein.

DETAILED DESCRIPTION OF THE PREFERRED EMBODIMENT

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

As used in this application, the terms "component", "module", "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component.

Figure 1A:
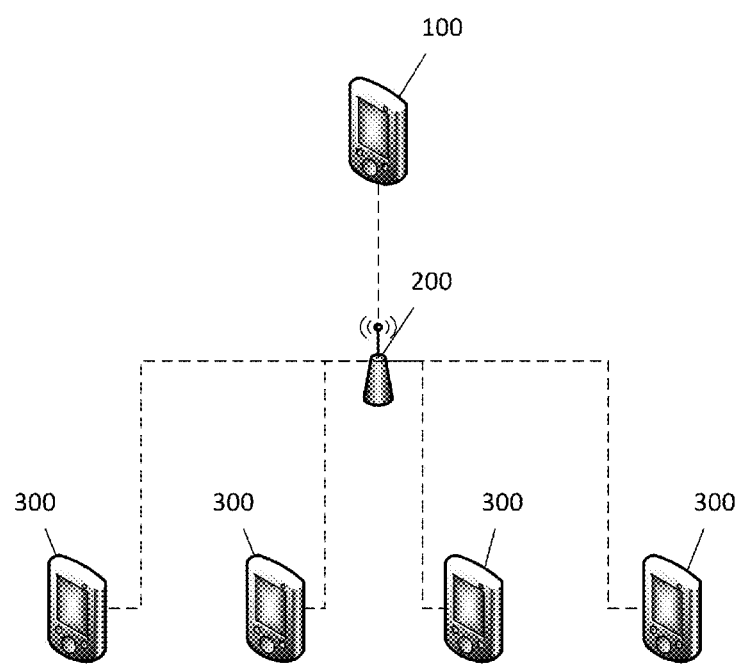
FIG. 1A is a schematic view of a group of devices acting in concert.
Figure 1B:
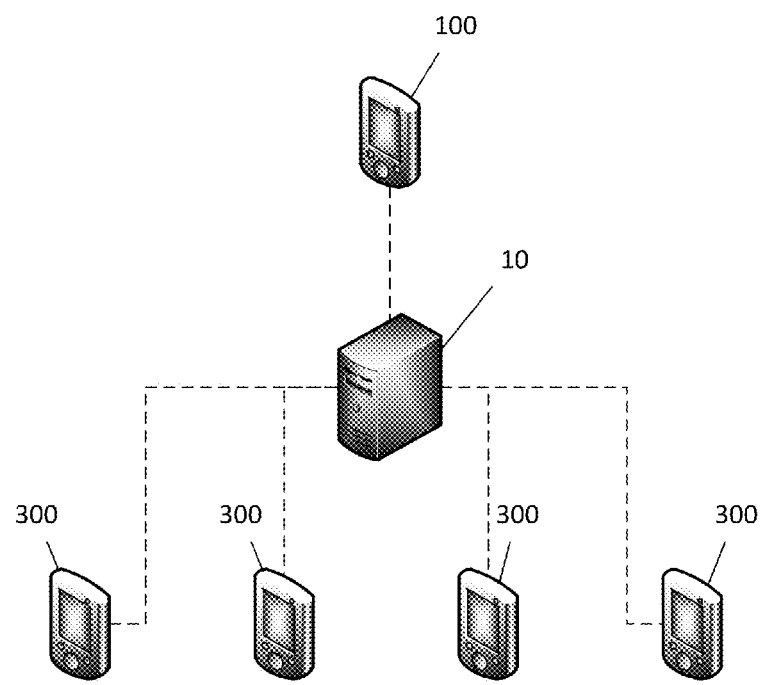
FIG. 1B is a schematic view of a group of devices acting in concert in an alternative embodiment.

Referring to FIG. 1A, the system of device acting in concert is displayed. The system comprises a master device 100, a central communication hub 200, and a plurality of slave devices 300. The master device 100 is communicatively coupled to the communication hub 200. The communication hub 200 is communicatively coupled to the plurality of slave devices 300. The master device 100 can send a set of instructions through the communication hub 200 to each of the slave devices 300. In one embodiment, the slave devices 300 perform the operation dictated by the set of instructions without user intervention. In another embodiment the slave devices 300 display the action that is to be performed and require user intervention prior to performing the operation in the set of instructions. In an alternative embodiment of the invention, as illustrated in FIG. 1B, the master device 100 is communicatively coupled to a server computer 10. The server computer 10 is communicatively coupled to a plurality of slave devices 300.

In the preferred embodiment of the invention the master device 100 is a mobile computing device identical to the plurality of slave devices 300. Both the master device 100, and each slave device 300, may be a wireless cellular phone, tablet computer, desktop computer, laptop computer, or any other computerized device. In another embodiment, the slave device 300 may be any other type of audiovisual device configured to receive data. For instance, the slave device 300 may be a jumbotron, television, projector, display screen, or any other type of audiovisual device.

Figure 2:
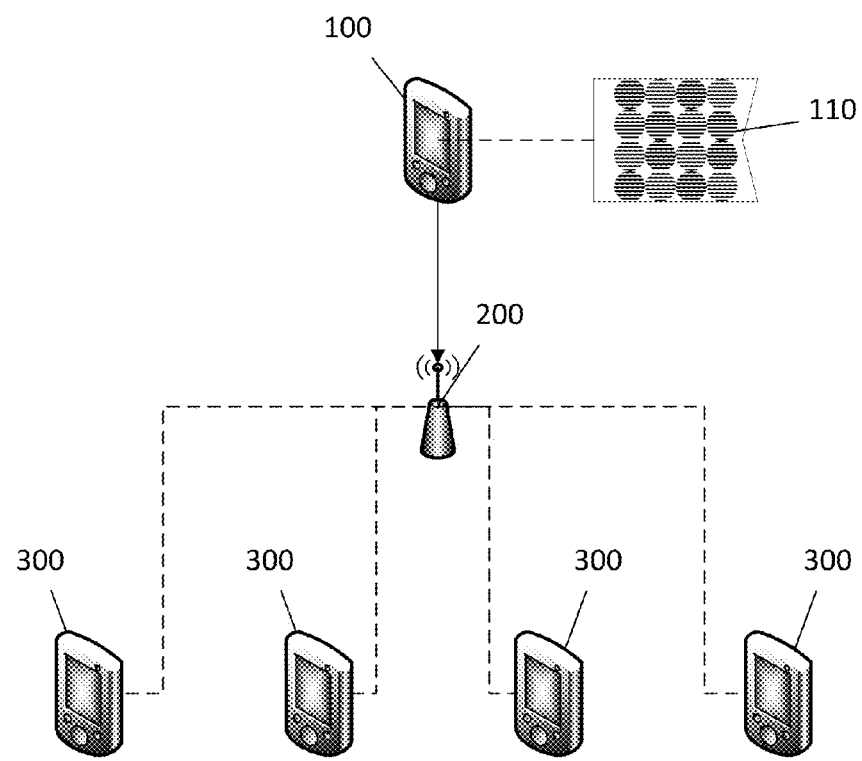
FIG. 2 is a schematic view of a group of devices acting in concert.
Figure 3:
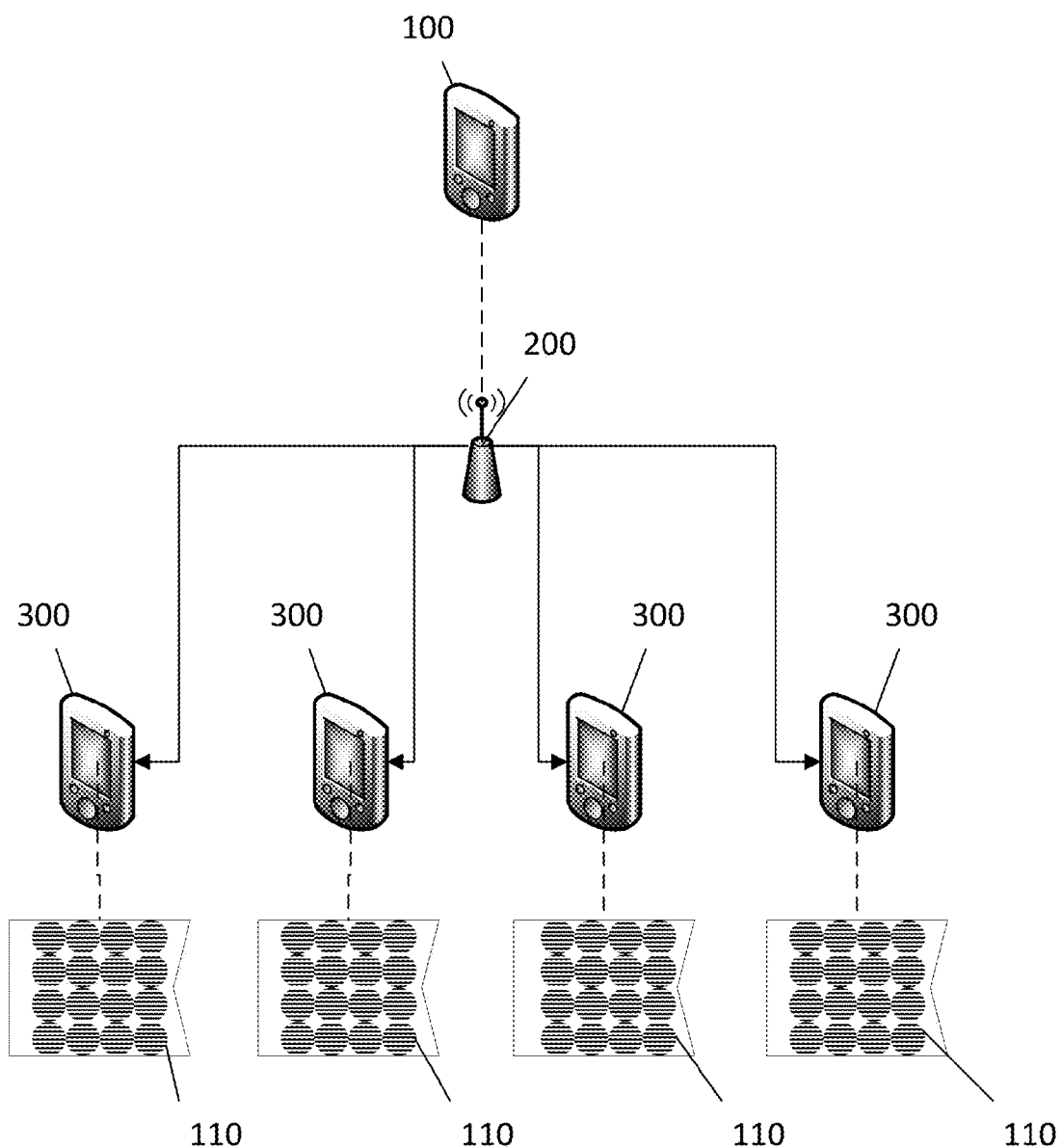
FIG. 3 is a schematic view of a group of devices acting in concert.

Referring to FIG. 2, the user of the master device 100 chooses an audio/visual display 110 to be publicly performed by the slave devices 100. Once the user of the master device 100 has chosen the desired or appropriate audio/visual display 110, the user of the master device pushes the audio/visual display out to the communication hub 200. As shown in FIG. 3, the communication hub 200 pushes the audio/visual display 110 to the slave devices 300. The slave devices 300 then publicly perform the audio/visual display 110. The slave devices 300 may publicly perform the audio/visual display 110 simultaneously or consecutively to create a movement effect across the plurality of slave devices 300.

Figure 4:
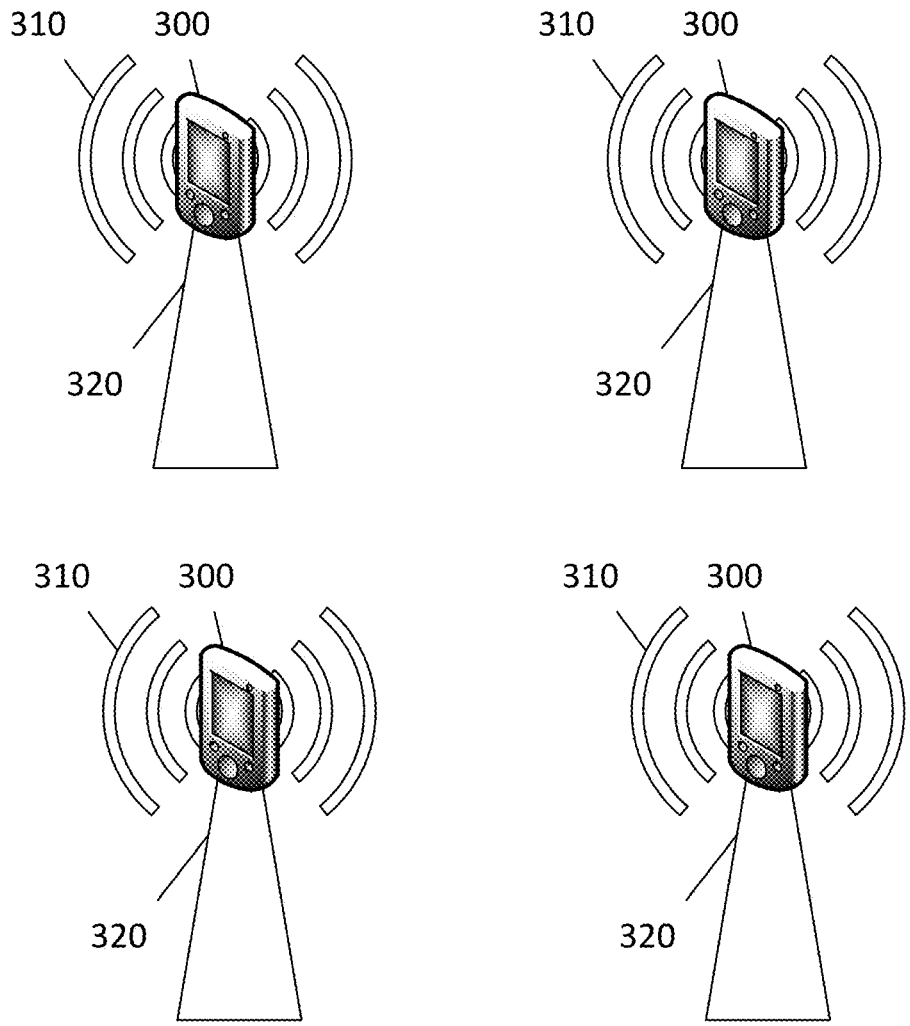
FIG. 4 is a schematic view of a group of devices acting in concert.

Referring to FIG. 4, the plurality of slave devices 300 performing in unison is displayed. The slave devices 300 may each play a dictated sound 310 or play a dictated display 320. The dictated sound 310 for each slave device 300 may be identical to the other slaves 300. Alternatively, the dictated sound 310 for each slave device 300 may be separate or selected from a specific group of sounds. The dictated sound 310 may be any type of sound, such as a beep or a honk, or also may be animal sounds or human speech. The dictated display 320 may be a static image or a motion picture. The dictated display 320 for each slave device may be identical to the other slave devices 300. Alternatively, the dictated display 320 for each slave device 300 may be separate or selected from a group of images or videos. The plurality of slave devices 300 may play the dictated sound 310 and/or dictated display 320 simultaneously. Alternatively, the plurality of slave devices 300 may play the dictated sound 310 and/or dictated display 320 consecutively, to create a visual or audial wave or ripple effect amongst the slave devices 300.

Figure 5:
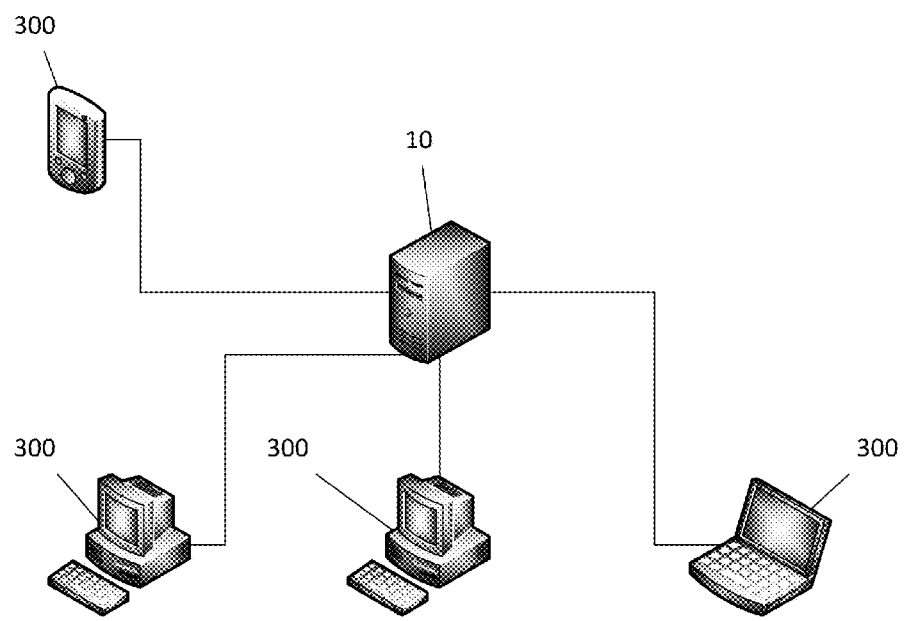
FIG. 5 is a schematic view of the system performing the method of the invention.

Referring to FIG. 5, the system of the invention is displayed during the bidding process. At this point in time, there is no master device 100 until the winning user has won the bidding process. The slave devices 300 at this point in time are a plurality of client computers 300. The client computers 300 may be any type of computerized device, such as a smart phone, a tablet computer, a desktop computer, or a laptop computer. The client computers 300 are communicatively connected to a central server computer 10. The server computer 10 handles the bidding transactions between the client computers 300. Once a specific user has won the bidding then the server computer 10 grants leadership control of the event to the winning bidder.

In some embodiments the server computer 10 may generate a set of instructions for the master device 100 and a set of instructions for the slave the devices 300 and send the instructions to the respective devices. The set of instructions for the master device 100 contain a control password. The set of instructions for the slave devices 300 contain a control query. The master device 100 sends a set of instructions for an action to be performed to the slave devices with the control password embedded. When a slave device 300 receives the instructions from the master device 100 the control query verifies the information in the control password and will only perform the instructed task if the control password satisfies the control query.

Figure 6:
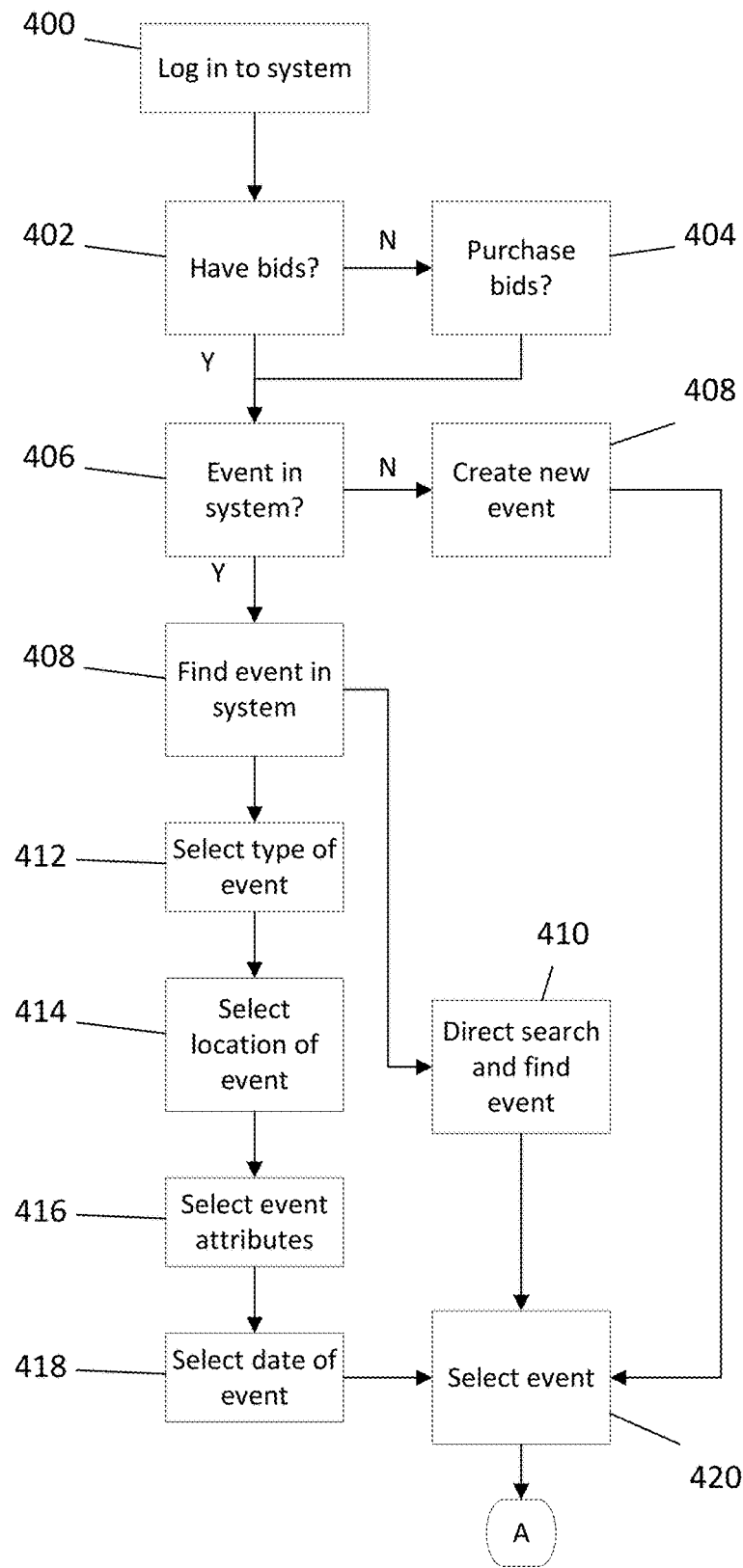
FIG. 6 is a schematic view of the method of the invention.
Figure 7:
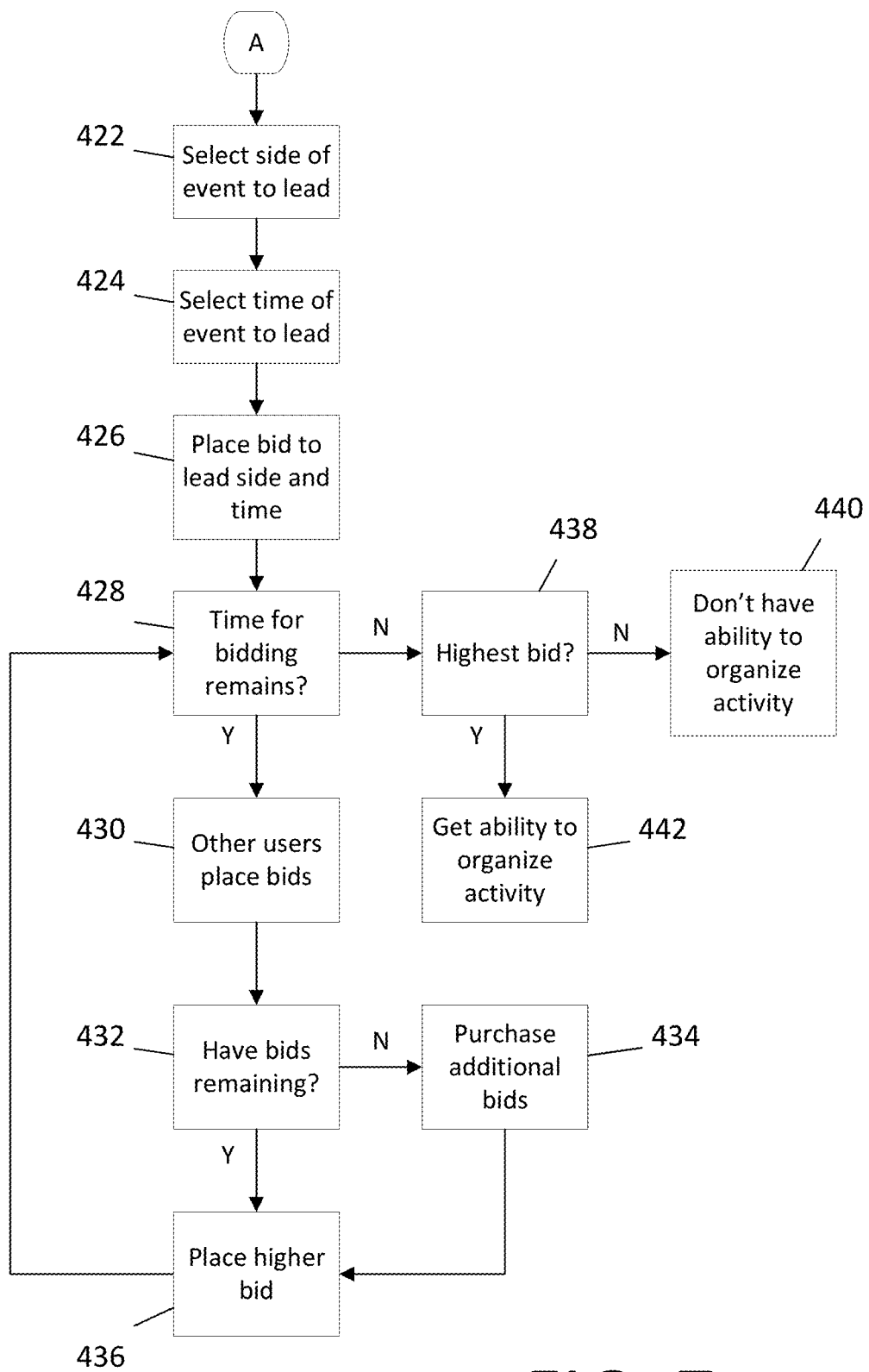
FIG. 7 is a schematic view of the method of the invention.

Referring to FIG. 6 and FIG. 7, the method of the invention is displayed. First a user logs in to the system 400. The system determines if the user has bids 402. If the user does not have bids to use then the user can purchase bids 404. Then the user can determine if the desired event is already present in the system 406. If the desired event is not present then the user can create a new event 408. The user then selects the created event 420 and proceeds to bidding. If the desired event is in the system then the user can find the event 408. The user may perform a direct search and find the event 410. Afterwards the user selects the event 420 and proceeds to bidding. Alternatively the user may browse for the desired event. The user may select the type of event 412. The user may select the location of the event 414. The user may select particular attributes about the event 416. The user may select the date of the event 418. After receiving input from the user about the desired event, the system presents the appropriate events to the user. The user then selects the desired event 420 and proceeds to bidding.

The leader status granted for an event may be broken up so that there is a leader for each faction at the event. In addition the leader status may be for only a partial amount of time for the event. The user first selects the side, or faction, of the event to lead 422. The user then selects the desired time period of the event to lead 424. The user then places a bid to be the leader 426. The system determines if there is additional time remaining for bidding 428. If time remains then other users may place bids 430. If the first user desires to place another bid then the system determines if that user has bids remaining 432. If not, then the user has the option to purchase additional bids 434. If the user has additional bids and desires to bid again then the user can place an additional higher bid 436. The system then determines if time for bidding remains 428. Once the predetermined amount of time for the bidding has expired then the system determines if the user had the highest bid 438. If the user did not have the highest bid then the user does not have the ability to organize activity for the event 440. If the user did have the highest bid then the user is granted the ability to organize activity for the event 442.

Figure 8:
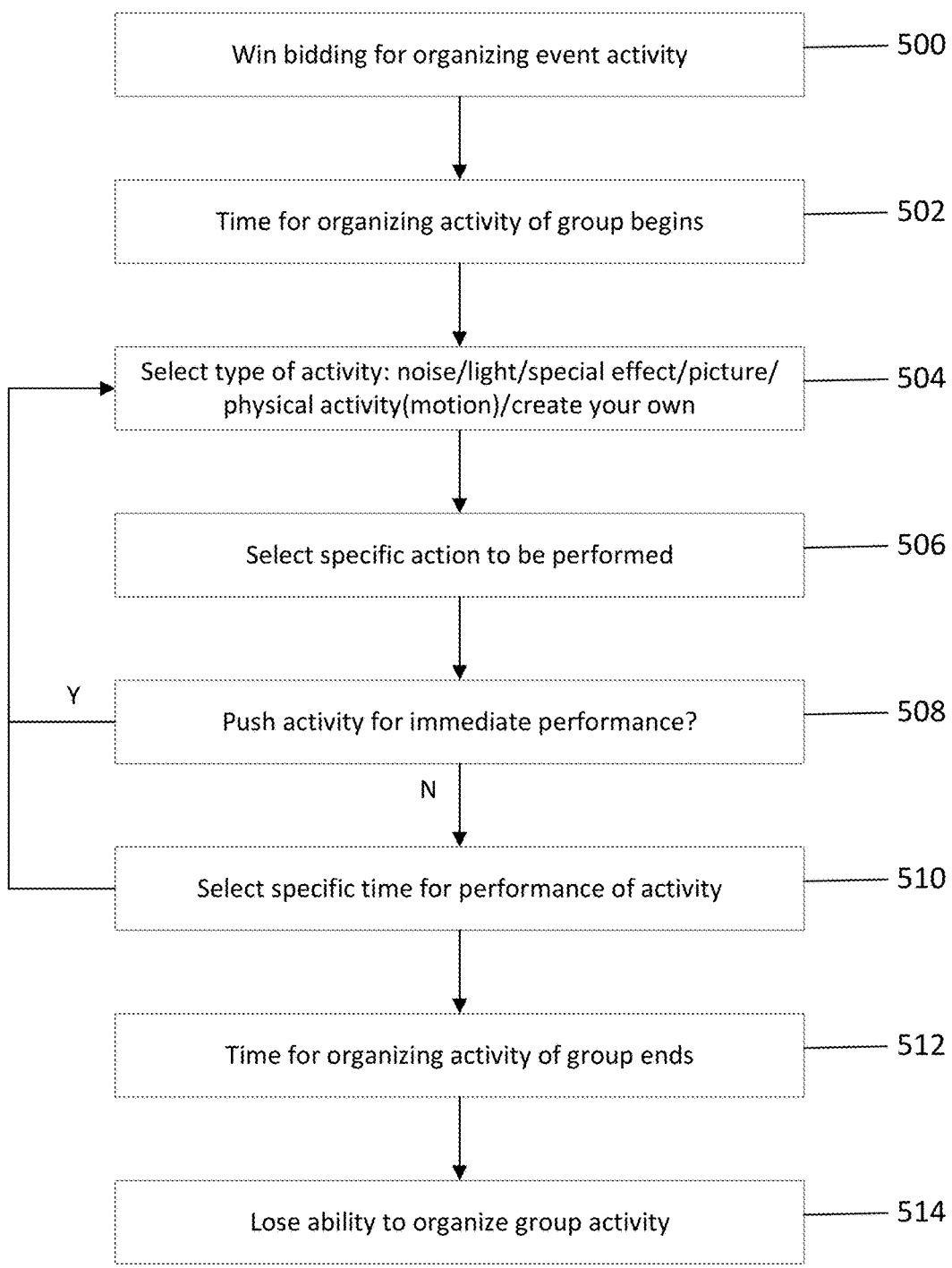
FIG. 8 is a schematic view of the method of the invention.

Referring to FIG. 8, the method of the master device 100 controlling the slave devices 300 is displayed. First, the user of the master device wins the bidding for organizing the event activity 500. Then the time for organizing the activity of the group begins 502. The user can select the type of activity to be performed, such as a specific noise, light, special effect, picture, physical activity (motion), or a user created activity 504. The user selects the specific action to be performed by the slave devices 506. The user may push out the activity to the slave devices for immediate performance 508. If the user does not push out the activity for immediate performance then the user may select a specific time for the performance of the activity 510. The user may repeat these actions as many times as desired during the time that the user has control over organizing the activity. The time for organizing the activity of the group eventually ends 512. The user then loses the ability to organize the group activity 514.

Figure 9A:
FIG. 9A is an illustrative view of the user interface of a device performing the method of the invention.
Figure 9B:
FIG. 9B is an illustrative view of the user interface of a device performing the method of the invention.
Figure 10A:
FIG. 10A is an illustrative view of the user interface of a device performing the method of the invention.
Figure 10B:
FIG. 10B is an illustrative view of the user interface of a device performing the method of the invention.
Figure 11A:
FIG. 11A is an illustrative view of the user interface of a device performing the method of the invention.
Figure 11B:
FIG. 11B is an illustrative view of the user interface of a device performing the method of the invention.
Figure 11C:
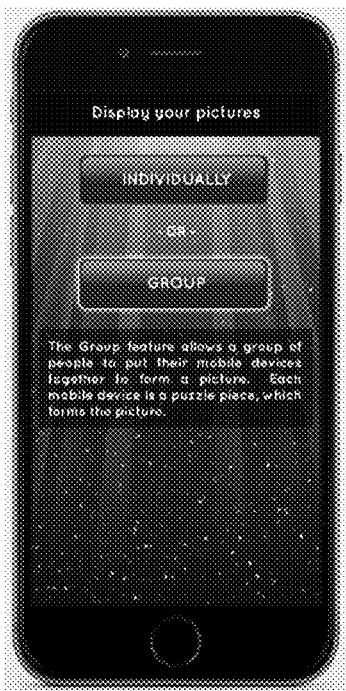
FIG. 11C is an illustrative view of the user interface of a device performing the method of the invention.
Figure 11D:
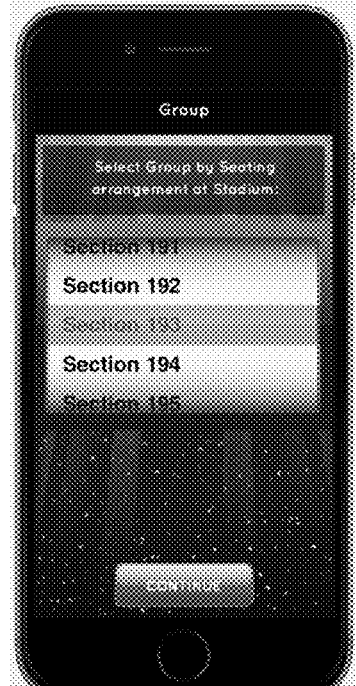
FIG. 11D is an illustrative view of the user interface of a device performing the method of the invention.
Figure 12A:
FIG. 12A is an illustrative view of the user interface of a device performing the method of the invention.
Figure 12B:
FIG. 12B is an illustrative view of the user interface of a device performing the method of the invention.

The user organizing the group of slave devices 300 may select any type of activity to be performed by the slave devices. As shown in FIG. 9A, the user may select "Cheers/Boos." Then, as shown in FIG. 9B, the user may select "Slow Clap Applause," "Formal Applause," "Raucous Applause," "Bravo Applause," "Mild Boos," "Vicious Boos," or "Whistle (w/fingers)." As shown in FIG. 10A the user may choose "Special Effects." Then, as illustrated in FIG. 10B, the user may select "Fireworks," "Lighter," "Sparkler," "Aurora Borealis," "Lightning," "Light Bulb," "Tesla Coil," or "Red Plasma." As shown in FIG. 11A, the user may select "Pictures." Then, as illustrated in FIG. 11B, the user may choose a picture to upload. Alternatively, the user may be able to select from a group of predetermined pictures. Then, as shown in FIG. 11C, the user may select to display the picture independently or as a group. When displayed as a group, the picture is divided up into pieces. Each slave device 300 displays a piece of the picture. The aggregate display of all of the slave devices 300 is the picture chosen by the user. As shown in FIG. 11D, the user may select a specific location at the event to perform the action (such as a specific location in a stadium at a sporting event). Referring to FIG. 12A, the user may choose "Noisemakers." Then, as shown in FIG. 12B, the user may select "N.Y.E. Horn," "Vuvuzela," "Accordion," "Bicycle Horn,"

Figure 12C:
FIG. 12C is an illustrative view of the user interface of a device performing the method of the invention.

"Whistle," "Fog Horn," "Cowbell" or "Rattler." As shown in FIG. 12C, the user may select any of these actions to be performed immediately or at a later time. If at a later time, the user may select a specific time according to the time of day or may choose a time according to the time of the event (such as time left on a game clock).

Figure 13A:
FIG. 13A is an illustrative view of the user interface of a device performing the method of the invention.
Figure 13B:
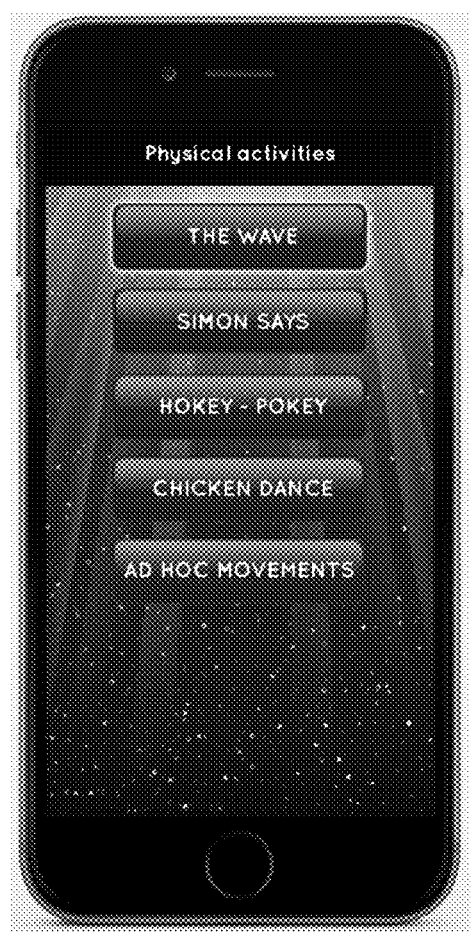
FIG. 13B is an illustrative view of the user interface of a device performing the method of the invention.

In addition, as shown in FIG. 13A, a user may select "Physical Activities" for an activity to be performed by the group of individuals at the event. As illustrated in FIG. 13B, the user may then select a physical activity such as "The Wave," "Simon Says," "The Hokey-Pokey," "Chicken Dance," or "Ad Hoc Movements." When the user selects a specific activity, such as "The Wave," the users of the slave devices 300 are notified that the group will be performing the wave. The notification may be a text message or an audio instruction played by the slave device 300. If the user selects "Ad Hoc Movements," the user may select a preset physical movement for the users to perform or may type a set of instructions on how to move which are then sent to the users of the slave devices 300. The instructions on how to move may be delivered to different groups of people at different times to create the effect of movement through the group. Alternatively, the instructions may be sent to all simultaneously but will tell the respective recipients when the action should be performed to create the illusion of movement through the group.

When selecting an event, the user may select any type of event. For instance, the user may select a sporting event, a music concert, a political event, or create a new event. Optionally, the system may present special single time branded events, such as the Olympics. If the user selects a sporting event, the user may then select the country of the event and the specific sport, such as basketball, football, baseball, soccer, hockey, auto racing, or any other type of sporting event. If the user selects a sport such as football then the user may choose the level of play, such as professional, college, or high school. Afterwards the user may choose the league. For instance if the user selects professional football the user may select the NFL, CFL, or AFL (arena football). The user then selects the date of the game and the specific game desired. When choosing to bid on games, a user may choose a specific team to lead the organization for. For instance, if the user selects a Chicago vs. Green Bay football game, the user may choose to lead the activities for Chicago fans. The user then selects the time frame to lead, such as pre-game, first half, halftime, or second half.

As an additional illustration, if the user selects a music event, the user may then select the type of music event, such as rock 'n roll, country, R&B, rap, classical, easy listening, or any other style of music. The user then selects the specific artist under that style. For instance, if a user selects country music then the user may select Miranda Lambert. The user then selects the specific concert for that artist for the user to organize the devices at the event. The user may then select the specific time of the concert that the user wants to control, such as pre-concert, during the opening act(s), or during the main act of the concert.

As an additional illustration, the user may choose a political event. The user then select a party affiliation, such as democrat, independent, or republican. Once the user selects the political party, the user may then select a specific candidate. After choosing a specific candidate, the user can then select a specific political event, such as a debate, a rally, or a town hall meeting.

As an additional illustration, the user may choose a special event or special series of events such as the Olympics. The user may then select a specific event at the Olympics, such as boxing, canoe, cycling, diving, equestrian, fencing, or soccer. The user may then select the participant country in the event. The user may then select the specific date, time, and location of the event. For instance, the user may select a first round soccer game from the Olympics.

As an additional illustration, a user may select to create their own event. When creating their own event, a user can input the date, time, location, and type of event into the system. The user may add any additional relevant information about the event, such as people or groups involved and the overall purpose of the event. Once the event has been added to the system other users may now find the event for bidding purposes.

In another embodiment, a user may create their own effect for use by the plurality of slave devices 300. A user can create a unique audio file for performance by the slave devices 300. This unique audio file may be a voice recording, a music recording, or a sound effect created or chosen by the user. In addition, a user may create a unique photo, visual effect, or movie file to be performed by the slave devices 300. The unique photo, visual effect, or movie file may be a photo created or chosen by the user. In one embodiment the user created content may be shareable with other users at different events or stored for later use and chosen by users at another time.

The system and method presents patentable subject matter. The system is directed to more than just an abstract idea. The invention is directed toward a method which improves the functionality of the mobile electronic devices. When coordinating the activities of individual electronic devices by hand, each electronic device must store information and execute specific lines of code to be able coordinate together. This represents a large aggregate of computing power. By centralizing the storage and processing of the instructions for the coordinated action in the master device and processor, and then transferring the results to the slave devices, the aggregate computing power required is lower and the slave devices can operate more efficiently.

In addition, the patent is directed to "something more" than an abstract idea. In one embodiment, the system can include the utilization of a jumbotron screen at a sporting event where the leader of the event has the ability to send messages to the system which are posted on the jumbotron screen. Also, the system is more than the application of an idea by a computer but is instead the synergistic effort of multiple processors in multiple devices to create a new and inventive system and method. In another embodiment of the invention the system is incorporated into specialized firmware and circuitry specifically designed to perform the method of the invention.

The system and method of the invention is best perceived as a system and method for appointing and changing a master computer to control a plurality of slave computers. The process of changing master computers is known. For instance, U.S. Pat. No. 6,907,226 (Kang, et al.), the disclosure of which is hereby fully incorporated by reference, discloses a method for switching master devices within a Piconet. However, Kang is limited. First, it discloses that a hand off of master status is initiated by the master device sending a switch request to a second device (FIG. 3). Furthermore, Kang is limited to a total of seven slave devices for one master device. In addition, under Kang, slave devices only transmit data to the master device and are unable to transmit data to other slaves. The inventive process of the current invention is an improvement over Kang.

Under the current invention, the status of switching master designation status is initiated by the slave device. Additionally, there may be any number of slave devices operating under a single master device. Furthermore, the current invention permits slave devices to communicate with each other.

The invention overcomes these deficiencies by operating as a series of interactions between specific application layers on each device such that the one of the slave devices may be appointed to act as a master device without the master device actually relinquishing control to the appointed master device. As shown by FIG. 1B the server computer 10 is the true master device of the plurality of slave devices 300. The master device 100, which is a single slave device that has been appointed to act as the master device, sends an instruction to the server computer 10. The server computer 10 then relays the received command to the plurality of slave devices 300. Through this method, the header information of data packets sent by the master device 100 is only sent to the server computer and is not passed on to the plurality of slave devices 300. The header information of the data packets sent by the server computer 10 to the plurality of slave computers 300 identifies the source as the server computer 10 and does not identify the master device 100. Therefore, each slave device 300 does not receive header information identifying the master device 100 as the source of the data packet. This speeds up the process of receiving and executing commands by the plurality of slave devices 300 because the slave devices 300 do not have to verify the trust of any specific master device when a new slave device is appointed to act as the master. In addition, the appointed master device does not need access to the MAC addresses of each of the slave devices 300 but only the address of the server computer 10.

Figure 14:
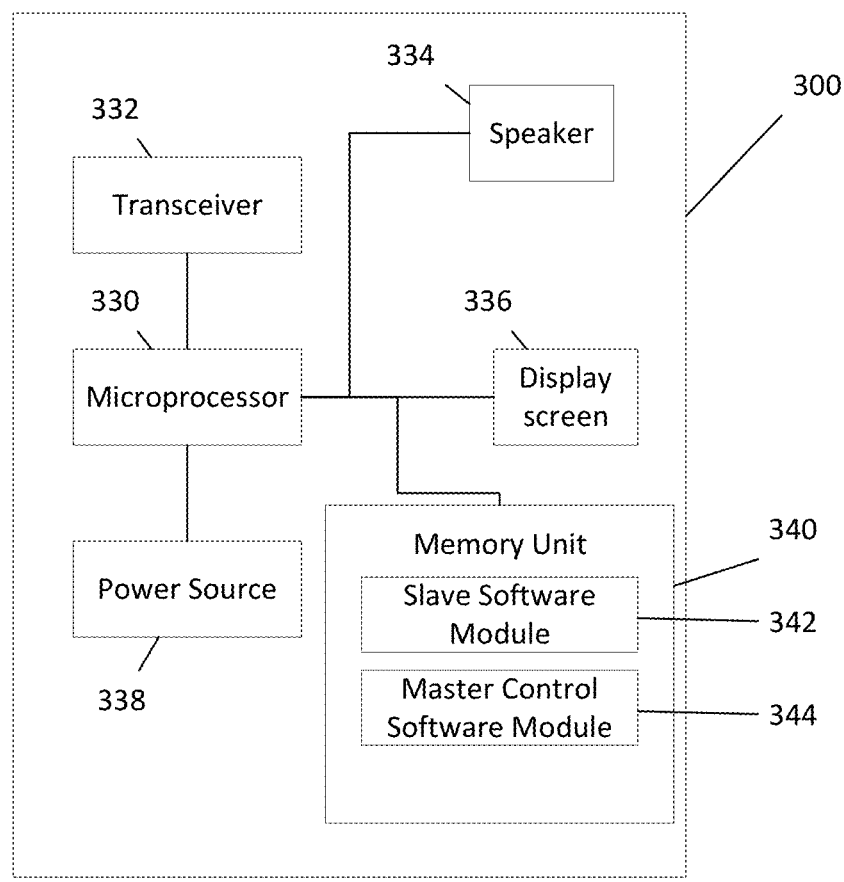
FIG. 14 is a schematic of a slave device.

Referring to FIG. 14, a preferred embodiment of the slave device 300 is illustrated. The slave device 300 comprises a microprocessor 330, a transceiver 332, a power source 338, a speaker 334, a display screen 336, and a memory unit 340. The microprocessor 330 is any computing chip, MCU, or "computer-on-a-chip" component. The transceiver 332 is any communication component configured to transmit and receive information with other computerized devices. The power source 338 is a battery or battery pack power source. The speaker 334 is a component configured to emit noise. The display screen 336 is a display configured to display lights or images. In the preferred embodiment the display screen 336 is a touch enabled display screen. The memory unit 340 is a memory storage device configured to store data, information, or store executable code instructions to be executed by the microprocessor 330. The memory unit 340 stores a slave software module 342 and a master control software module 344. In another embodiment the slave software module 342 and master control software module 344 are stored on the microprocessor 330. The slave software module 342 is a set of code which is configured to receive slave commands and execute the slave commands received from the server computer 10. The master control software module 344 is a set of code which is configured to present slave command options to a user, receive a selection of a slave command, and transmit the slave command to the server computer 10.

Figure 15:
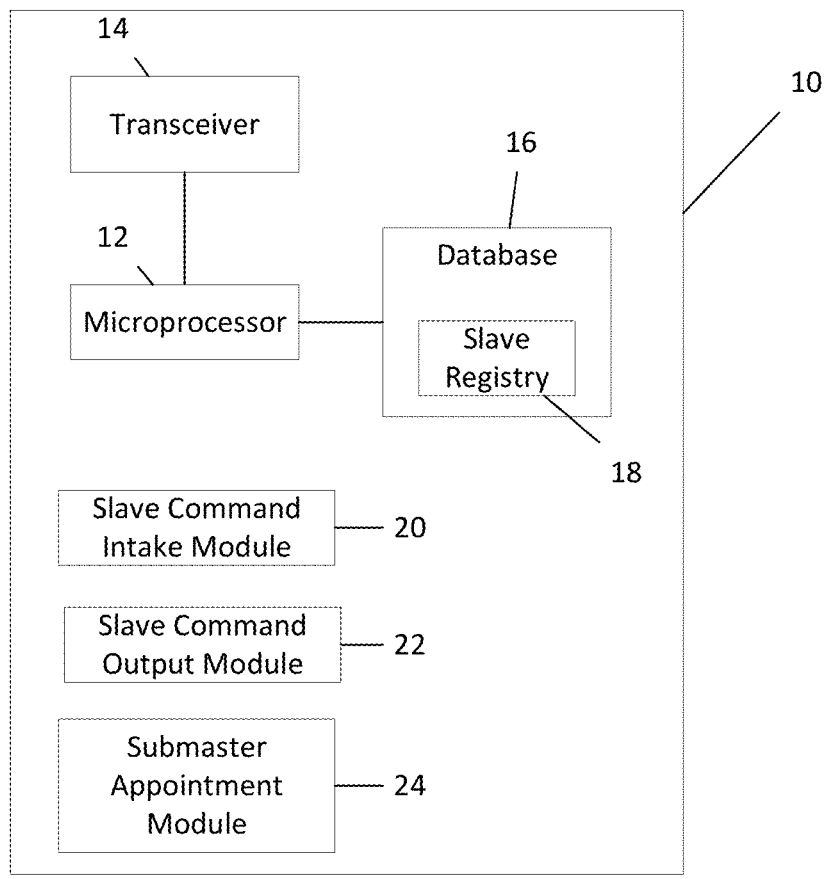
FIG. 15 is a schematic of a server device.

Referring to FIG. 15, the preferred embodiment of the server computer 10 is illustrated. The server computer comprises a microprocessor 12, a transceiver 14, and a database 16. The microprocessor 12 is any computing chip, MCU, or "computer-on-a-chip" component. The transceiver 14 is any communication component configured to transmit and receive information with other computerized devices, either wired communication or wireless communication. The database 16 is a memory storage device configured to store data, information, or store executable code instructions to be executed by the microprocessor 12. The database 16 stores a slave registry 18. The slave registry 18 is a list of all recognized slave devices 300 which have registered with the server computer 10. The slave registry 18 may save destination port information concerning each slave device 300 to ensure that the slave commands are sent to and received from the correct slave devices 300. The slave registry 18 can also save information about the specific event or events for which the respective slave devices 300 are registered for.

The server computer 10 also stores a slave command intake module 20. The slave command intake module 20 is a set of code which is executed by the microprocessor 12. The slave command intake module 20 recognizes the specific slave device which has been appointed as the master device 100 for the specific event. The slave command intake module 20 receives the slave commands from the appointed master device 100 through the master control software module 344. The server computer 10 also stores a slave command output module 22. The slave command output module 22 is a set of code which is executed by the microprocessor 12. The slave command output module 22 recognizes the specific slave device which has been appointed as the master device 100 for the specific event. The slave command output module 22 transmits the slave command to the respective slave devices 300 which have been registered for a specific event as stored by the slave registry 18. The server also stores a submaster appointment module 24. The submaster appointment module 24 is a set of code which is executed by the microprocessor 12. The submaster appointment module 24 provides a mechanism for determining which slave device is to be appointed as the master device 100. The submaster appointment module 24 may present a bidding system, a lottery system, a first to select system, or any other type of method of appointing a slave device as the appointed master device 100. For instance the submaster appointment module 24 may allow each user to vote and elect a submaster. In another embodiment, the appointment module allows each user to bid for leader status with the master being appointed to the winning bidder. In another embodiment the submaster appointment module 24 may randomly select a device to be the master device 100. In another embodiment the submaster appointment module 24 confers a master designation to the first user or device to select to be the master of the event.

Figure 16A:
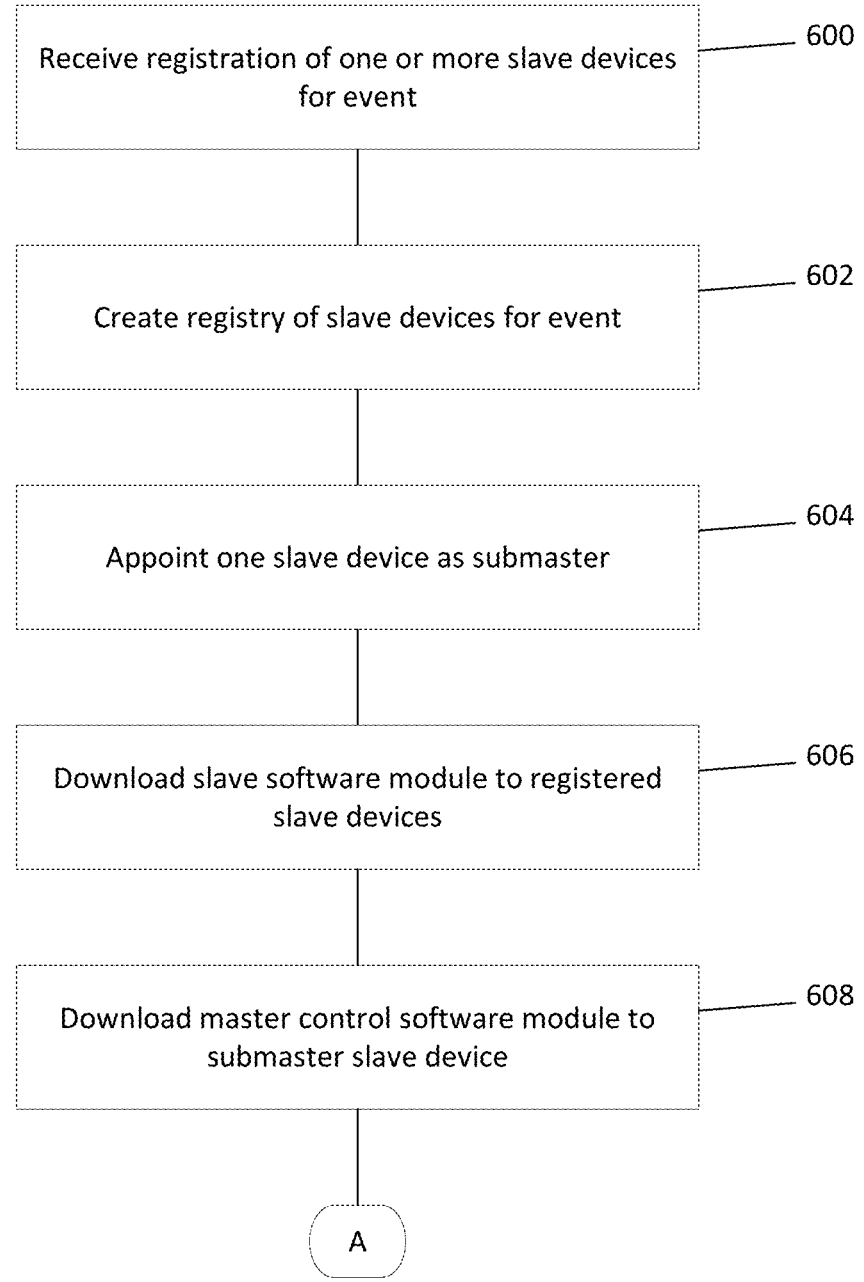
FIG. 16A is a schematic view of a method of the invention.
Figure 16B:
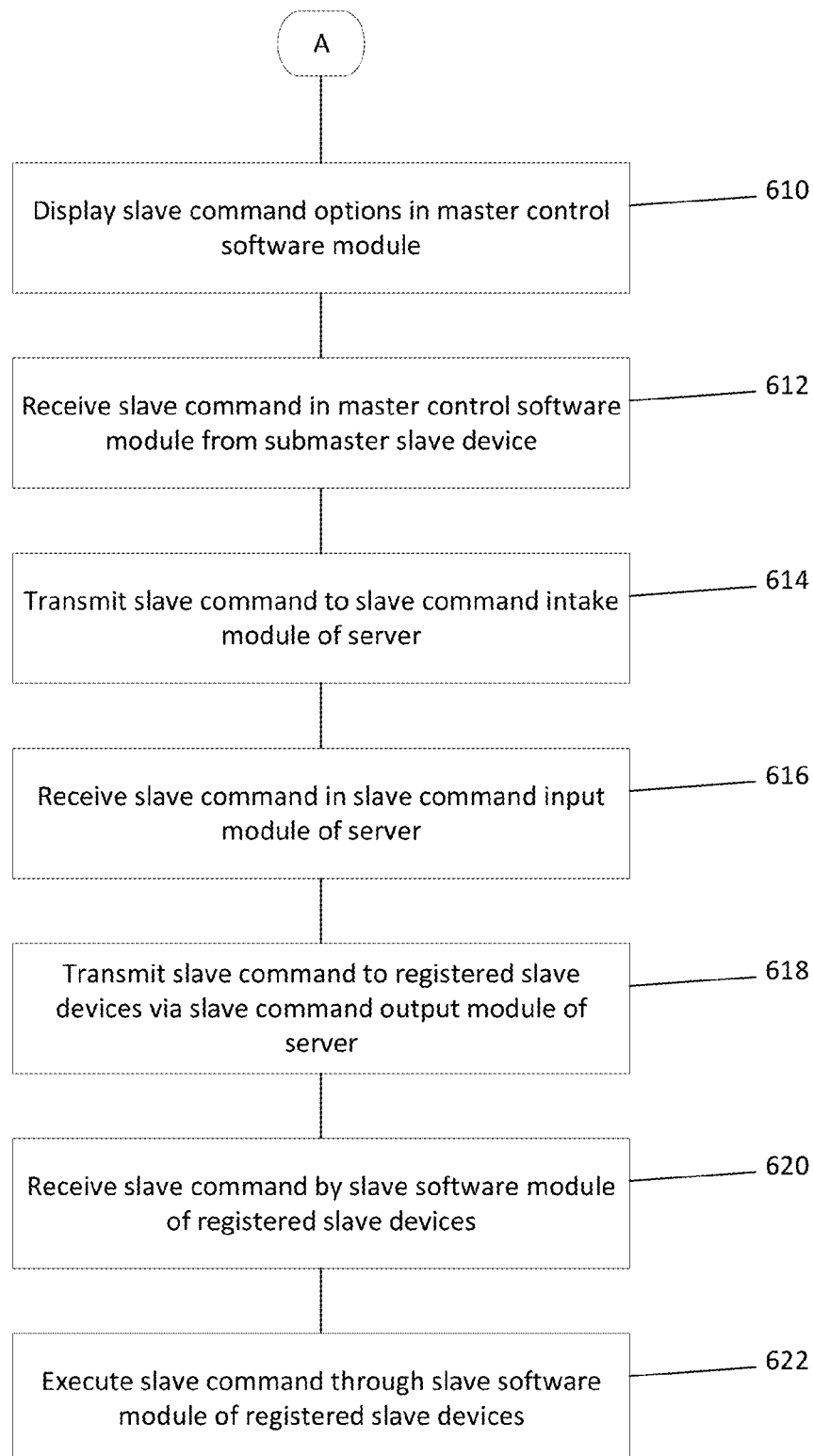
FIG. 16B is a schematic view of a method of the invention.

The method of the invention is illustrated by FIGS. 16A and 16B. First the server computer receives a registration of one or more slave devices for an event 600. The server then creates a registry of the slave devices for the specific event 602. The server appoints one of the slave devices as the appointed master device during the event 604. The slave software module is downloaded to the registered slave devices 606. The master control software module is downloaded to the appointed master device 608. The download of the separate modules may occur at any time prior to the event. This could be prior to the creation of the event in the server computer.

During the event the master control software module displays a series of slave command options on the display screen of the appointed master device 610. The master control software module receives a slave command from the user 612. The master control software module transmits the slave command to the slave command intake module of the server 614. The server receives the slave command in the slave command intake module 616. The slave command output module of the server transmits the slave command to each of the respective registered slave devices for the event listed in the event registry 618. Each respective slave software module of the registered slave devices receives the slave command from the server 620. The respective slave software module of the registered slave devices execute the slave commands 622.

In one embodiment of the invention, the separate software modules of the master device 100, server 10, and slave devices 300 may operate as a part of the application layer of each respective device. In another embodiment the software modules are separate from the application layer of the respective devices.

In one embodiment, the server computer 10 recognizes the master device 100 and slave devices 300 through their destination port information, which is saved in the slave registry 18. In another embodiment, the server computer 10 recognizes the master device 100 and slave devices 300 when a user logs in to the server via a password protected user ID so that the user may use any device as the master device 100 or slave device 300 without the server recognizing the IP address of the device used. In one embodiment the slave commands are communicated through the separate devices through standard TCP/IP data packets.

It is anticipated that any event can be defined by a series of event parameters so that the system may operate separate events at once. The event parameters may include the type of event (music concert, sporting event, rally, etc.), the date of the event, the location of the event, the time of the event, the side of the event supported (such as the specific team supported at a sporting event), the seating location of the individuals or group of individuals, or any other user specified event parameter.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module, which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A computer implemented method of controlling one or more computerized devices comprising
   a) creating, by a server computer comprising one or more microprocessors and one or more nonvolatile memory units, an event
      i) wherein said event is defined by one or more event parameters;
   b) appointing, by said server computer, a master device designation to a computerized device for said event, wherein said computerized device comprises on or more microprocessors and one or more nonvolatile memory units;
   c) initiating a communication channel with one or more slave devices, wherein each of said one or more slave devices comprises one or more microprocessors and one or more nonvolatile memory units;
   d) initiating a slave application layer on one or more slave devices;
   e) presenting through said slave application layer a registration option for said event;
   f) receiving, by said one or more slave devices, a registration selection for said event;
   g) initiating a master application layer on said computerized device;
   h) presenting, through said master application layer, one or more slave command options;
   i) receiving, on said computerized device, one or more slave commands;
   j) transmitting said one or more slave commands to one or more registered slave devices through said communication channel;
   k) receiving, by said server computer, a map of a location of said event;
   l) receiving, by said server computer, a physical location of one or more slave devices in reference to said map; and
   m) delaying a slave command by a predetermined amount of time based on said physical location of said one or more slave devices in reference to said map.

2. The method as in claim 1 further comprising executing said one or more slave commands through said slave application layer on said one or more slave devices.

3. The method as in claim 2 wherein said slave command is selected from a group comprising: displaying a predetermined image on a display screen of said one or more slave devices, playing a predetermined sound through a speaker of said one or more slave devices, illuminating a light on said one or more slave devices, playing a predetermined portion of a song on said one or more slave devices.

4. The method as in claim 2 further comprising presenting, by said server computer, a means for selecting a computerized device to receive a master designation.

5. The method as in claim 1 further comprising creating a registry list of one or more slave devices.

6. The method as in claim 5 further comprising presenting, by said server computer, a means for selecting a computerized device to receive a master designation.

7. The method as in claim 1 further comprising presenting, by said server computer, a means for selecting a computerized device to receive a master designation.

8. The method as in claim 1 further comprising
   a) receiving, by said server computer, a request to create an event;
   b) creating, by said server computer, an event.

9. The method as in claim 1 further comprising
   a) removing, by said server computer, a master device designation from said computerized device;
   b) appointing, by said server computer, a master device designation to a second computerized device for said event, wherein said second computerized device comprises on or more microprocessors and one or more nonvolatile memory units.

10. The method as in claim 1 further comprising
    a) receiving a password protected user identification from said one or more slave devices;
    b) verifying said password protected user identification for said one or more slave devices;
    c) receiving a password protected user identification from said computerized device;
    d) verifying said password protected user identification for said computerized device.

11. The method as in claim 3 further comprising
    a) receiving a predetermined image by said server computer;
    b) dissecting, by said server computer, said predetermined image into two or more portions;
    c) transmitting, by said server computer, a single portion of said two or more portions to one or more slave devices.

12. The method as in claim 11 further comprising presenting, by said server computer, a means for selecting a computerized device to receive a master designation.

13. The method as in claim 12 further comprising
    a) receiving, by said server computer, a request to create an event;
    b) creating, by said server computer, an event.

14. The method as in claim 3 further comprising creating a registry list of one or more slave devices.

15. The method as in claim 3 further comprising presenting, by said server computer, a means for selecting a computerized device to receive a master designation.

16. The method as in claim 3 further comprising
    a) receiving, by said server computer, a request to create an event;
    b) creating, by said server computer, an event.

17. The method as in claim 3 further comprising
    a) removing, by said server computer, a master device designation from said computerized device;
    b) appointing, by said server computer, a master device designation to a second computerized device for said event, wherein said second computerized device comprises on or more microprocessors and one or more nonvolatile memory units.

18. The method as in claim 3 further comprising
    a) receiving a password protected user identification from said one or more slave devices;
    b) verifying said password protected user identification for said one or more slave devices;
    c) receiving a password protected user identification from said computerized device;
    d) verifying said password protected user identification for said computerized device.

* * * * *